US012611773B2

(12) United States Patent
Imanishi

(10) Patent No.: US 12,611,773 B2
(45) Date of Patent: Apr. 28, 2026

(54) ROBOT CONTROL DEVICE, ROBOT CONTROL SYSTEM, AND NON-TRANSITORY COMPUTER-READABLE MEDIUM STORING A COMPUTER PROGRAM

(71) Applicant: FANUC CORPORATION, Yamanashi (JP)

(72) Inventor: Kazutaka Imanishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 171 days.

(21) Appl. No.: 18/264,543

(22) PCT Filed: Feb. 14, 2022

(86) PCT No.: PCT/JP2022/005755
§ 371 (c)(1),
(2) Date: Aug. 7, 2023

(87) PCT Pub. No.: WO2022/176818
PCT Pub. Date: Aug. 25, 2022

(65) Prior Publication Data
US 2024/0042610 A1 Feb. 8, 2024

(30) Foreign Application Priority Data

Feb. 18, 2021 (JP) ................................. 2021-024063

(51) Int. Cl.
*B25J 9/16* (2006.01)
(52) U.S. Cl.
CPC ........... *B25J 9/1666* (2013.01); *B25J 9/1651* (2013.01)
(58) Field of Classification Search
CPC ......... B25J 9/00; B25J 9/16; B25J 9/02; B25J 9/161; B25J 9/1674; B25J 19/06;
(Continued)

(56) References Cited

U.S. PATENT DOCUMENTS

| | | | |
|---|---|---|---|
| 11,254,003 B1 * | 2/2022 | Zhao | ..................... G05D 1/0217 |
| 2011/0074171 A1 * | 3/2011 | Maehara | ................ B25J 9/1679 |
| | | | 700/213 |

(Continued)

FOREIGN PATENT DOCUMENTS

| | | |
|---|---|---|
| JP | H09-244724 A | 9/1997 |
| JP | 2006-068857 A | 3/2006 |

(Continued)

OTHER PUBLICATIONS

Sueda et al., "WO 2020194752 A1," Oct. 1, 2020 (Year: 2020).*

(Continued)

*Primary Examiner* — Adam R Mott
*Assistant Examiner* — Byron Xavier Kasper
(74) *Attorney, Agent, or Firm* — Studebaker Brackett PLLC

(57) ABSTRACT

The objective of the present invention is to provide a technology enabling interference between a robot and a peripheral object to be reliably avoided, while confirming the safety of a generated robot path. A robot control device 3 is provided with: a data transmitting and receiving unit 32 for acquiring a robot path generated in such a way as to avoid interference between a robot 30 and a peripheral object, on the basis of a three-dimensional model of the robot 30 and the peripheral object; an interference determining unit 35 for determining, for each prescribed sector, whether there is a high probability of the robot 30 interfering with the peripheral object when the robot 30 is moved in accordance with the acquired robot path; and an override changing unit 36 for lowering the speed of the robot 30 or stopping the movement of the robot 30 for sectors in which the interference determining unit 35 has determined that the probability of interference is high.

5 Claims, 5 Drawing Sheets

E : DIRECTION IN WHICH FORCE IS EASILY OUTPUT
D : DIRECTION IN WHICH FORCE IS NOT EASILY OUTPUT

(58) Field of Classification Search

CPC ...... B25J 9/1656; B25J 9/1666; B25J 9/1651; B25J 9/1676; G05B 19/4061; G05B 2219/39082; G05B 2219/39091; G05B 2219/40339; G05B 2219/40476

See application file for complete search history.

(56)                    References Cited

U.S. PATENT DOCUMENTS

| | | | | |
|---|---|---|---|---|
| 2018/0297204 A1 * | 10/2018 | Krasny | ................... | B25J 9/163 |
| 2019/0114798 A1 * | 4/2019 | Afrouzi | ............... | G05D 1/0272 |
| 2021/0143047 A1 * | 5/2021 | Yamaguchi | ......... | B25J 11/0095 |
| 2021/0362338 A1 * | 11/2021 | Rhim | ...................... | G06T 17/00 |

FOREIGN PATENT DOCUMENTS

| | | | | |
|---|---|---|---|---|
| JP | 2008279524 A | * | 11/2008 | |
| JP | 2010-201592 A | | 9/2010 | |
| JP | 2012139806 A | * | 7/2012 | |
| JP | 2015-098076 A | | 5/2015 | |
| JP | 2015-160277 A | | 9/2015 | |
| JP | 2017-024160 A | | 2/2017 | |
| JP | 2018-134703 A | | 8/2018 | |
| JP | 2019-089201 A | | 6/2019 | |
| JP | 2019-123052 A | | 7/2019 | |
| JP | 2020-082285 A | | 6/2020 | |
| JP | 2020-516475 A | | 6/2020 | |
| WO | WO-2020194752 A1 | * | 10/2020 | ............. G05B 19/18 |

OTHER PUBLICATIONS

Wang et al., "CN 111558940 A," Aug. 21, 2020 (Year: 2020).*

International Search Report issued in PCT/JP2022/005755; mailed May 17, 2022.

Tanaka, Hiroshi et al.; "Trajectory Tracking Control Redundant Manipulators Based on Avoidance Manipulability"; SICE Annual Conference in Sapporo; Aug. 4-6, 2004; vol. 3; pp. 1962-1967; fig.3.

Minami, Mamoru et al.; "Avoidance Manipulability for Redundant Manipulators"; Journal of the Robotics Society of Japan; Sep. 1999; vol. 17, No. 6; pp. 887-895.

* cited by examiner

E:DIRECTION IN WHICH FORCE IS EASILY OUTPUT
D:DIRECTION IN WHICH FORCE IS NOT EASILY OUTPUT

ROBOT CONTROL DEVICE, ROBOT CONTROL SYSTEM, AND NON-TRANSITORY COMPUTER-READABLE MEDIUM STORING A COMPUTER PROGRAM

TECHNICAL FIELD

The present disclosure relates to a robot control device, a robot control system, and a non-transitory computer-readable medium storing a computer program.

BACKGROUND ART

For the purpose of achieving automated machining, a system has been constructed in which a machine tool is connected to a robot, thereby automating attaching and detaching of a workpiece to be machined. For example, since the inside of a machine tool such as a lathe is narrow and difficult to see, in order to cause a robot to attach or detach a workpiece, it is necessary to teach a position for the robot such that the robot will not interfere with peripheral objects such as the machine tool. To this end, a technique has been disclosed which facilitates creation of a robot program for enabling avoidance of interference between a robot and peripheral objects (for example, see Patent Document 1).

According to the technique disclosed in Patent Document 1, a three-dimensional model composed of a robot and peripheral objects is created, and a start point position and an end point position for the robot are specified in the created three-dimensional model. Subsequently, a path for the robot is automatically calculated so as to make the robot avoid interference with the peripheral objects present in the section from the start point position to the end point position in the three-dimensional model. In this way, the path for the robot to avoid the interference can be automatically generated regardless of the operator's skill level.

Patent Document 1: Japanese Unexamined Patent Application, Publication No. 2015-160277

DISCLOSURE OF THE INVENTION

Problems to be Solved by the Invention

However, according to the technique disclosed in Patent Document 1, if there is an error in the setting of the three-dimensional model inputted by the operator, the robot may interfere with a peripheral object such as a machine tool when moved in an actual environment along the path generated based on the three-dimensional model. Therefore, there is a demand for a technique that reliably enables avoidance of interference between a robot and a peripheral object while checking safety of a generated robot path.

It is an object of the present disclosure to provide a technique that reliably enables avoidance of interference between a robot and a peripheral object while checking safety of a generated robot path.

Means for Solving the Problems

An aspect of the present disclosure provides a robot control device including: an acquisition unit configured to acquire a robot path for avoiding interference between a robot and a peripheral object present near the robot, the robot path being generated based on a three-dimensional model including the robot and the peripheral object; an interference determination unit configured to determine, for each of predetermined section, whether a possibility for the robot to interfere with the peripheral object is high in a case where the robot is moved along the robot path acquired by the acquisition unit; and a speed changing unit configured to reduce a speed of the robot or stop movement of the robot in the predetermined section where the possibility for the robot to interfere with the peripheral object is determined to be high by the interference determination unit.

Another aspect of the present disclosure provides a robot control system including: a robot path generation device that includes a robot path generation unit configured to generate the robot path for avoiding the interference between the robot and the peripheral object present near the robot based on the three-dimensional model including the robot and the peripheral object, and a transfer unit configured to transfer, as a robot program, the robot path generated by the robot path generation unit to the robot control device; and the robot control device described above. The robot control device further includes a program activation unit configured to active the robot program transferred by the transfer unit; and a program management unit configured to manage the robot program activated by the program activation unit, cause the interference determination unit to make a determination, and cause the speed changing unit to perform a speed change.

A yet another aspect of the present disclosure provides a non-transitory computer-readable medium storing a computer program for a computer that stores a robot program for controlling motion of a robot, the non-transitory computer-readable medium storing the computer program causing the computer to perform operations that include: acquiring a robot path for avoiding interference between the robot and a peripheral object present near the robot, the robot path being generated based on a three-dimensional model including the robot and the peripheral object; determining, for each predetermined section, whether a possibility for the robot to interfere with the peripheral object is high in a case where the robot is moved along the robot path; and reducing a speed of the robot or stopping movement of the robot in the predetermined section where the possibility for the robot to interfere with the peripheral object is determined to be high.

The present disclosure makes it possible to make a determination for a section in which the possibility of interference between the robot and the peripheral object is high, that is, a section in which the posture of the robot considerably changes. The moving speed of the robot in the section is lowered or reduced to 0, thereby making it possible to reliably avoid the interference between the robot and the peripheral object, while checking the safety of the generated robot path. Therefore, in an operation test of the robot, the robot is slowly moved only in a necessary section(s), whereby the operation test can be efficiently performed while reliably avoiding interference and checking the safety of the generated robot path.

PREFERRED MODE FOR CARRYING OUT THE INVENTION

Embodiments of the present disclosure will be described below in detail with reference to the drawings. First and second embodiments include configurations in common, and a description of the common configurations will not be repeated in the description of the second embodiment.

First Embodiment

Figure 1:
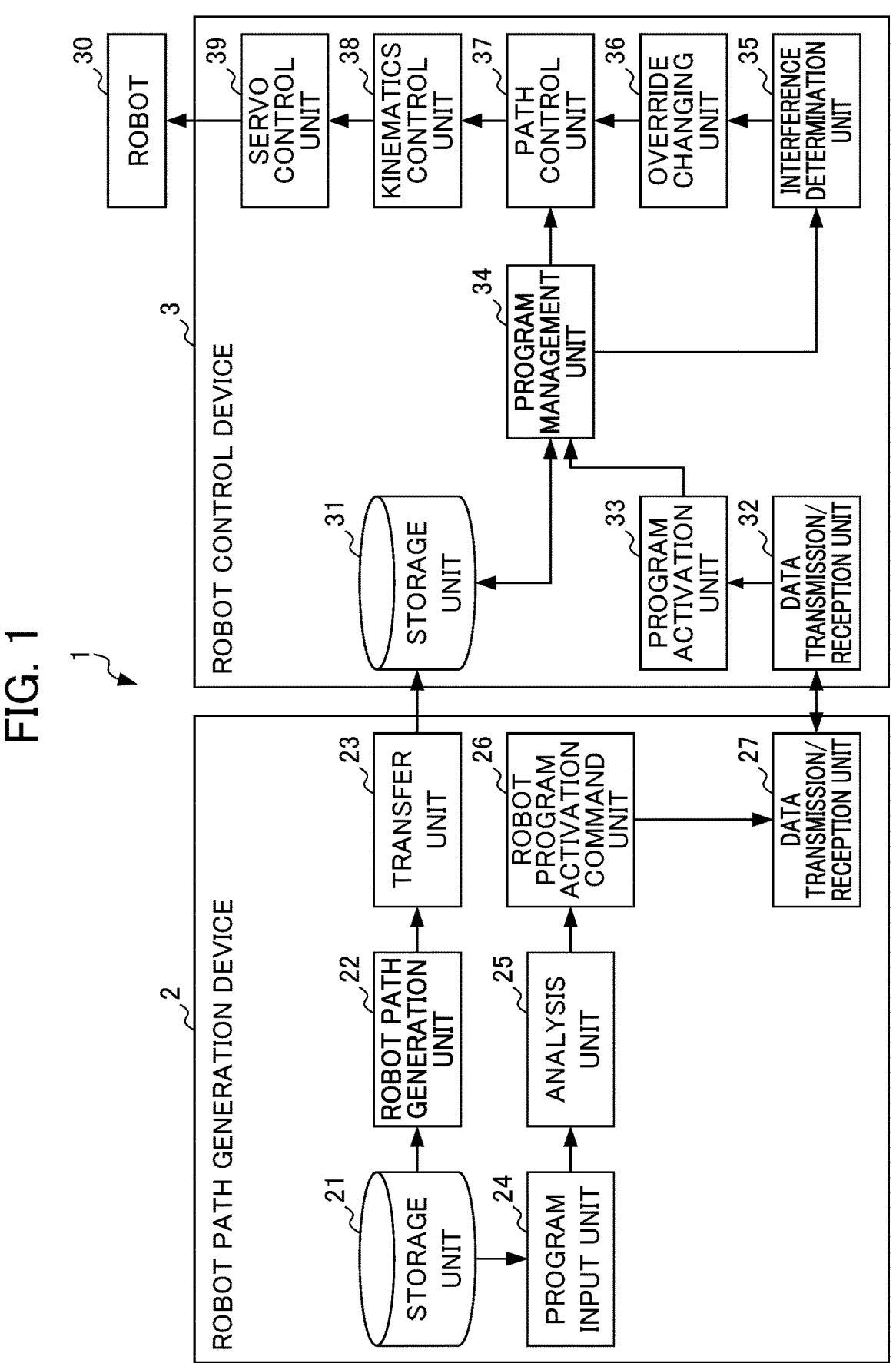
FIG. 1 is a functional block diagram of a robot control system according to a first embodiment.

FIG. 1 is a functional block diagram of a robot control system 1 according to a first embodiment. The robot control system 1 according to the present embodiment includes a robot path generation device 2 for generating a robot path, and a robot control device 3 for controlling motion of a robot 30.

The robot path generation device 2 according to the present embodiment may be installed in a numerical controller (CNC) that controls motion of a machine tool (not shown) provided in the vicinity of the robot 30, or may be provided in a personal computer or the like. In the following, an example in which the robot path generation device 2 is provided in a numerical controller will be described.

The robot control system 1 according to the present embodiment controls motion of the machine tool and motion of the robot 30 in conjunction with each other by means of the robot path generation device 2 (the numerical controller) and the robot control device 3 that are communicatively connected to each other.

The machine tool machines a workpiece (not shown) in accordance with machine tool control signals transmitted from the robot path generation device 2 (the numerical controller). Examples of the machine tool include, but are not limited to, a lathe, a ball mill, a milling machine, a grinding machine, a laser processing machine, and an injection molding machine.

The robot 30 moves under the control of the robot control device 3, and performs predetermined work on the workpiece to be machined inside the machine tool such as a lathe. The robot 30 is, for example, an articulated robot and includes an arm having, at its distal end, a tool for holding, machining, or inspecting the workpiece. In the following, a case where the robot 30 is a six-axis articulated robot will be described, but the present disclosure is not limited thereto. Furthermore, although the case where the robot 30 is the six-axis articulated robot will be described below, the number of the axes is not limited to six.

Each of the robot path generation device 2 and the robot control device 3 is a computer constituted by hardware including: arithmetic processing means, such as a central processing unit (CPU); auxiliary storage means, such as a hard disk drive (HDD) and a solid state drive (SSD), in which various computer programs are stored; main storage means, such as a random access memory (RAM), in which data temporarily required for the arithmetic processing means to execute the programs is stored; operation means, such as a keyboard, with which an operator performs various operations; and display means, such as a display, for displaying various kinds of information to the operator. The robot path generation device 2 and the robot control device 3 can transmit and receive various signals to and from each other via Ethernet (registered trademark), for example.

First, the configuration of the robot path generation device 2 will be described in detail. By means of the hardware configuration described above, the robot path generation device 2 performs a machine tool control function of controlling motion of the machine tool and a function of generating a motion path for a control axis of the robot 30. Specifically, the robot path generation device 2 performs various functions including functions of a storage unit 21, a robot path generation unit 22, a transfer unit 23, a program input unit 24, an analysis unit 25, a robot program activation command unit 26, a data transmission/reception unit 27, etc.

The storage unit 21 includes a program storage, a machine coordinate value storage, a robot coordinate value storage, a robot's teaching position storage, and a three-dimensional model storage, all of which are not shown.

The program storage stores, for example, a plurality of numerical control programs created based on operations performed by the operator. More specifically, the numerical control programs stored in the program storage include a program composed of a plurality of machine tool-associated command blocks for controlling motion of the machine tool, a program composed of a plurality of robot-associated command blocks for controlling motion of the robot, and other programs. The numerical control programs stored in the program storage are each written in a known programming language for controlling the motion of the machine tool, such as G code or M code.

The machine coordinate value storage stores machine coordinate values that indicate positions of various axes (i.e., a position of a tool rest of the machine tool, a position of a table, etc.) of the machine tool that operates in accordance with the numerical control program described above. These machine coordinate values are defined in a machine tool coordinate system whose origin is set to a reference point determined at an arbitrary position on the machine tool or in the vicinity of the machine tool. The machine coordinate value storage is successively updated by way of a process (not shown) such that the machine coordinate value storage stores the latest values of the machine coordinate values that successively change in accordance with the numerical control program.

The robot coordinate value storage stores robot coordinate values that indicate a position and a posture of a control point (e.g., the arm's distal end) of the robot 30 that operates under the control of the robot control device 3, in other words, robot coordinate values that indicate positions of the control axes of the robot 30. These robot coordinate values are defined in a robot coordinate system different from the machine tool coordinate system. The robot coordinate value storage is successively updated with robot control coordinate values acquired from the robot control device 3 by way of a process (not shown) such that the robot coordinate value storage stores the latest values of the robot coordinate values that successively change in accordance with the numerical control program.

The robot's teaching position storage stores teaching positions, such as a start point and an end point for the robot 30, that have been inputted by the operator. Specifically, robot's teaching position storage stores teaching positions for the robot 30 that have been inputted via a teach pendant or the like, and teaching positions that have been inputted via the keyboard or the like. The teaching positions for the robot 30 include robot coordinate values indicating the positions of the control axes of the robot 30. These robot coordinate values are defined in the robot coordinate system different from the machine tool coordinate system.

The robot coordinate system is a coordinate system whose origin is set to a reference point determined at an arbitrary position on the robot 30 or in the vicinity of the robot 30. In the following, a case in which the robot coordinate system is different from the machine tool coordinate system will be described, but this case is a non-limiting example. The robot coordinate system may coincide with the machine tool coordinate system. In other words, the origin and the directions of the coordinate axes of the robot coordinate system may coincide with the origin and the directions of the coordinate axes of the machine tool coordinate system.

The robot coordinate system is switchable between two or more coordinate formats having different control axes. More specifically, in the numerical control program, the position and posture of the control point of the robot 30 can be specified in a rectangular coordinate format or a joint coordinate format. Alternatively, the position and posture of the control point of the robot 30 can be specified in a tool coordinate format.

In the joint coordinate format, the position and posture of the control point of the robot 30 are specified by means of six coordinate values in total, which are real numbers and have, as components thereof, rotational angle values (J1, J2, J3, J4, J5, J6) of the six joints of the robot 30.

In the rectangular coordinate format, the position and posture of the control point of the robot 30 are specified by means of six coordinate values in total, which are real numbers and have, as components thereof, three coordinate values (X, Y, Z) along the three orthogonal coordinate axes and three rotational angle values (A, B, C) around the respective orthogonal coordinate axes.

Here, in the joint coordinate format, the rotational angles of the joints of the robot 30 are directly specified, and accordingly, the axis arrangement of the arms and wrist of the robot 30 and a rotation number of the joints that can rotate by 360 degrees or more (hereinafter, these are collectively referred to as "configuration of the robot 30") are uniquely determined. In contrast, in the rectangular coordinate format, since the position and posture of the control point of the robot 30 are specified by means of the six coordinate values (X, Y, Z, A, B, C), the configuration of the robot 30 cannot be uniquely determined. Therefore, in a numerical control program for robot, the configuration of the robot 30 can be specified by means of a configuration value P that is an integer with a predetermined number of digits.

Thus, the position and posture of the control point of the robot 30 and the configuration of the robot 30 are represented by the six coordinate values (J1, J2, J3, J4, J5, J6) in the joint coordinate format, and are represented by the six coordinate values and one configuration value (X, Y, Z, A, B, C, P) in the rectangular coordinate format. For the sake of convenience, the configuration value P is also referred to as the coordinate value in the following description.

A tool coordinate system of the robot 30 defines a position of a tool tip point (TCP) of the robot 30 and a posture of the tool. The tool coordinate system is set by setting a motion around a mechanical interface coordinate system (a wrist flange surface) of the robot 30, i.e., an offset value from the origin of the mechanical interface coordinate system and rotation angles around the coordinate axes.

The three-dimensional model storage stores data regarding a robot system model created by arranging three-dimensional models that simulate three-dimensional shapes of the robot 30 and peripheral objects such as the machine tool in a virtual space. Here, the peripheral objects include, in addition to the machine tool, objects provided within a range of motion of the robot 30, such as a workpiece to be machined by the machine tool, a workpiece stocker in which a plurality of the workpieces are stocked, a pallet, a safety fence, etc. The robot path generation device 2 according to the present embodiment performs a simulation using the robot system model stored in the three-dimensional model storage, and thereby generates a motion path for the control axis of the robot 30 along which interference is avoided in the robot system model.

The robot path generation unit 22 generates a motion path of the control axis of the robot 30. More specifically, the robot path generation unit 22 generates a robot path such that interference between the robot 30 and the peripheral objects is avoided, based on the start point and the end point as the robot's teaching positions stored in the robot's teaching position storage and the three-dimensional model including the robot 30 and the peripheral objects. The robot path generation unit 22 writes the generated robot path as a robot program in the transfer unit 23.

In response the robot path generation unit 22 writing the generated robot path as the robot program, the transfer unit 23 transfers the robot path as the robot program to the storage unit 31 of the robot control device 3.

The program input unit 24 reads the numerical control programs from the program storage, and sequentially inputs them to the analysis unit 25.

The analysis unit 25 analyzes, for each command block, a command type that is based on the numerical control program inputted from the program input unit 24, and transmits the analysis result to a machine tool control unit (not shown) and the robot program activation command unit 26. More specifically, in a case where a command block is of a command type directed to the machine tool, the analysis unit 25 transmits a corresponding analysis result to the machine tool control unit, whereas in a case where a command is of a command type directed to the robot 30, the analysis unit 25 transmits a corresponding analysis result to the robot program activation command unit 26.

The machine tool control unit (not shown) generates machine tool control signals for controlling motion of the machine tool in accordance with the analysis result transmitted from the analysis unit 25, and inputs the generated machine tool control signals to actuators that drive various shafts of the machine tool. The machine tool moves in response to the machine tool control signals inputted from the machine tool control unit, and machines a workpiece (not shown). After controlling the motion of the machine tool in accordance with the numerical control program in the above-described manner, the machine tool control unit updates the machine coordinate values stored in the machine coordinate value storage using the latest machine coordinate values.

With respect to a robot program which is included in the programs stored in the storage unit 21 and the command block of which is analyzed to be of the command type directed to the robot 30 by the analysis unit 25, the robot program activation command unit 26 generates, at a predetermined timing, a robot program activation command that functions as a trigger for activating the robot program in the robot control device 3. The robot program activation command generated by the robot program activation command unit 26 is written using, for example, G code for numerical control programs. The robot program activation command generated by the robot program activation command unit 26 describes whether the robot program activation command is for a path checking mode or a normal motion mode in which path checking is not performed. The robot program activation command unit 26 writes the generated robot program activation command into the data transmission/reception unit 27. As regards each robot program analyzed by the analysis unit 25, a robot path is generated by the robot path generation unit 22, and then, the robot program is transferred to the robot control device 3 by the transfer unit 23 and stored in the storage unit 31. Therefore, upon transmission of a robot program activation command from the data transmission/reception unit 27 to the robot control device 3, one robot program which corresponds to the robot program activation command and for which the robot path has been generated is called from the storage unit 31 of the robot control device 3 and activated.

The data transmission/reception unit 27 transmits and receives various commands and data to and from a data transmission/reception unit 32 of the robot control device 3. In response to the robot program activation command unit 26 writing the robot program activation command, the data transmission/reception unit 27 transmits the robot program activation command to the data transmission/reception unit 32 of the robot control device 3.

As will be described later, in response to transmission of the robot program activation command from the data transmission/reception unit 27 to the data transmission/reception unit 32, the robot control device 3 causes a program activation unit 33 and a program management unit 34 to activate a robot program in which the robot path has been specified and which has been transferred and stored in a storage unit 31, whereby the robot control device 3 controls motion of the robot 30 based on the activated robot program.

Next, a configuration of the robot control device 3 will be described in detail. As shown in FIG. 1, the robot control device 3 performs, by means of the hardware configuration described above, various functions including functions of the storage unit 31, the data transmission/reception unit 32, the program activation unit 33, the program management unit 34, an interference determination unit 35, an override changing unit 36, a path control unit 37, a kinematics control unit 38, a servo control unit 39, etc. Specifically, the robot control device 3 controls motion of the robot 30 based on a command transmitted from the robot path generation device 2, by using the storage unit 31, the data transmission/ reception unit 32, the program activation unit 33, the program management unit 34, the interference determination unit 35, the override changing unit 36, the path control unit 37, the kinematics control unit 38, and the servo control unit 39.

The storage unit 31 constitutes an acquisition unit, and acquires and stores the robot paths as the robot programs generated by the robot path generation unit 22 of the robot path generation device 2 and transferred by the transfer unit 23. Each robot program stored in the storage unit 31 is called by the program management unit 34, which will be described later, and is activated and reproduced.

The data transmission/reception unit 32 inputs the robot program activation command generated by the robot program activation command unit 26 of the robot path generation device 2 and transmitted from the data transmission/ reception unit 27 to the program activation unit 33, which will be described later.

The program activation unit 33 inputs the robot program activation command, which has been inputted from the data transmission/reception unit 32, to the program management unit 34, which will be described later. The program activation unit 33 activates the robot program under the control of the program management unit 34.

The program management unit 34 manages the robot programs. Specifically, the program management unit 34 calls, from among the robot programs stored in the storage unit 31, one robot program corresponding to the robot program activation command inputted from the program activation unit 33, and activates and reproduces the called program. Furthermore, the program management unit 34 executes an instruction written in the activated robot program. In a case where the robot program to be activated is for the path checking mode, the program management unit 34 causes the interference determination unit 35 to make a determination and causes the override changing unit 36 to perform a speed change, as will be described later. In a case where the robot program to be activated is for the normal motion mode, the program management unit 34 sequentially provides the path control unit 37 with movement commands for the control axis of the robot 30.

The interference determination unit 35 moves the robot 30 in accordance with the robot path specified in the robot program that has been called from among the robot programs stored in the storage unit 31 and activated by the program management unit 34, and determines, for each predetermined section, whether a possibility for the robot 30 to interfere with the peripheral objects is high. Specifically, the interference determination unit 35 determines that the possibility for the robot 30 to interfere with the peripheral objects is high in a case where a current state corresponds to at least one of a state in which the robot 30 is in proximity to a configuration change point, a state in which the robot 30 is in proximity to a coordinate system switching point, or a state in which a large change occurs in a manipulability ellipsoid of the robot 30. It should be noted that the sections can be set in any manner without particular limitation. Regular sections may be set, or appropriate sections may be set according to the contents of the robot program.

The state in which the robot 30 is in proximity to the configuration change point refers to when the robot 30 is going to experience or has experienced a change in configuration at or around a singular point. Thus, when the robot 30 is in proximity to the configuration change point, the interference determination unit 35 determines that there is a high possibility for the robot 30 to interfere with the peripheral objects. Here, for example, in respect of a command position at which the robot takes a posture in which the rotation axes of two or more shafts are aligned in a straight line, the rotation angles of the shafts cannot be uniquely determined, and accordingly, it is not possible to move the robot 30 to such a position. The position at which the robot 30 cannot be controlled is called the singular point. When teaching is performed for the robot 30, the hand of the robot 30 is moved so as to avoid the singular point and the vicinity thereof. Therefore, in the case where the robot 30 changes in configuration at or around the singular point, it is estimated that measures to avoid interference with the peripheral objects have to be taken. Accordingly, the interference determination unit 35 determines that there is a high possibility for the robot 30 to interfere with the peripheral objects in this case. Whether or not the robot 30 is in proximity to the configuration change point can be determined by way of an analysis of the robot program. For example, in a case where the current coordinate system is the rectangular coordinate system, it can be determined that the robot 30 is in proximity to the configuration change point when a rate of change in arrangement (coordinate values) of each axis at the configuration value P and/or a rate of change in rotation number (rotation angle) at the configuration value P are equal to or greater than respective predetermined threshold values.

The state in which the robot 30 is in proximity to the coordinate system switching point refers to when the coordinate system of the robot 30 is going to switch or has switched between, for example, the joint coordinate system, the rectangular coordinate system, and the tool coordinate system. Thus, when the robot 30 is in proximity to the coordinate system switching point, the interference determination unit 35 determines that there is a high possibility for the robot 30 to interfere with the peripheral objects. The joint coordinate system, the rectangular coordinate system, and the tool coordinate system of the robot 30 are as described above. When the coordinate system of the robot 30 switches between these coordinate systems, it is estimated that measures to avoid interference with the peripheral objects have to be taken. Accordingly, the interference determination unit 35 determines that there is a high possibility for the robot 30 to interfere with the peripheral objects in this case.

Figure 2:
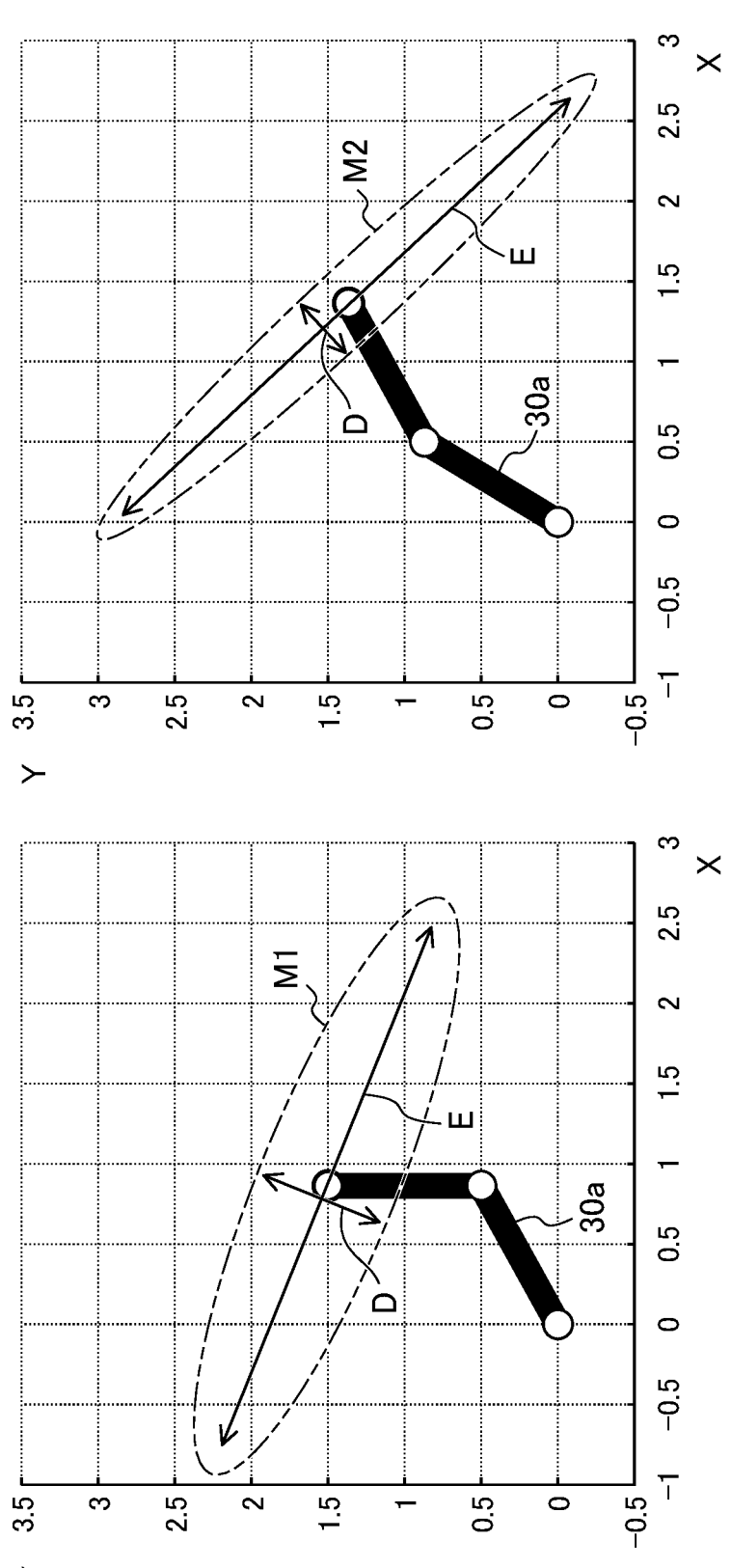
FIG. 2 illustrates examples of a manipulability ellipsoid of a robot.

The state in which a large change occurs in the manipulability ellipsoid of the robot 30 refers to when a rate(s) of change in the major axis and/or the minor axis of the manipulability ellipsoid of the robot 30 is/are equal to or greater than a predetermined threshold value(s). When such a large change occurs in the manipulability ellipsoid, the interference determination unit 35 determines that there is a high possibility for the robot 30 to interfere with peripheral objects. FIG. 2 illustrates examples of manipulability ellipsoids M1 and M2 of the robot 30. Each of the manipulability ellipsoids M1 and M2 of the robot 30 is an ellipsoid determined based on an eigenvalue λ and an eigenvector v of a matrix A calculated from a transposed matrix of a Jacobian matrix J representing a relationship between a joint speed $d\theta/dt$ of each joint of the robot arm 30$a$ and a hand speed $dx/dt$ of the robot 30. The eigenvector v represents a dimension in an axial direction of the manipulability ellipsoid, and the square root of the eigenvalue λ represents a dimension in an axial direction of the manipulability ellipsoid (the major axis and the minor axis of the ellipsoid). A large force can be outputted in the direction E where the dimension in the axial direction is large, whereas a large force cannot be outputted in the direction D where the dimension in the axial direction is small because the robot 30 approaches a singular point posture. Therefore, the robot 30 is normally controlled in a direction in which a large force can be outputted. However, when the robot 30 becomes likely to interfere with the peripheral object, the robot 30 is controlled in a direction different from the direction in which a large force can be outputted. Accordingly, when a rate(s) of change in the major axis and/or the minor axis of the manipulability ellipsoid of the robot 30 is/are equal to or greater than the predetermined threshold value(s), the interference determination unit 35 determines that there is a high possibility for the robot 30 to interfere with the peripheral objects. The threshold values are appropriately set through experiments or the like performed in advance.

Referring back to FIG. 1, the override changing unit 36 constitutes a speed changing unit, and reduces a speed of the robot 30 or stops movement of the robot 30 (changes the speed to 0) in a section in which the possibility for the robot 30 to interfere with the peripheral objects is determined to be high by the interference determination unit 35. Here, the robot control device 3 of the present embodiment has an override function of controlling the motion of the robot 30 by multiplying a motion condition by an override (multiplying factor: override amount) in order to adjust the motion condition of the robot 30 and perform optimal motion control without editing the robot program. Therefore, the override changing unit 36 reduces a speed override of the robot 30, thereby reducing the speed of the robot 30 or stopping the movement of the robot 30. As a result, in a section determined to correspond to at least one of the state in which the robot 30 is in proximity to the configuration change point, the state in which the robot 30 is in proximity to the coordinate system switching point, or the state in which a large change occurs in the manipulability ellipsoid of the robot 30, the speed of the robot 30 is reduced or the movement of the robot 30 is stopped, thereby making it possible to reliably avoid interference between the robot 30 and the peripheral objects while checking safety of the generated robot path.

The path control unit 37 calculates time series data of the control point of the robot 30 in accordance with a movement command provided from the program management unit 34, and inputs the time series data to the kinematics control unit 38.

The kinematics control unit 38 calculates a target angle for each joint of the robot 30 from the inputted time series data, and inputs the calculated target angles to the servo control unit 39.

The servo control unit 39 generates robot control signals for the robot 30 by performing feedback control on servo motors of the robot 30 so as to achieve the target angles inputted from the kinematics control unit 38, and inputs the robot control signals to the servo motors of the robot 30.

Figure 3:
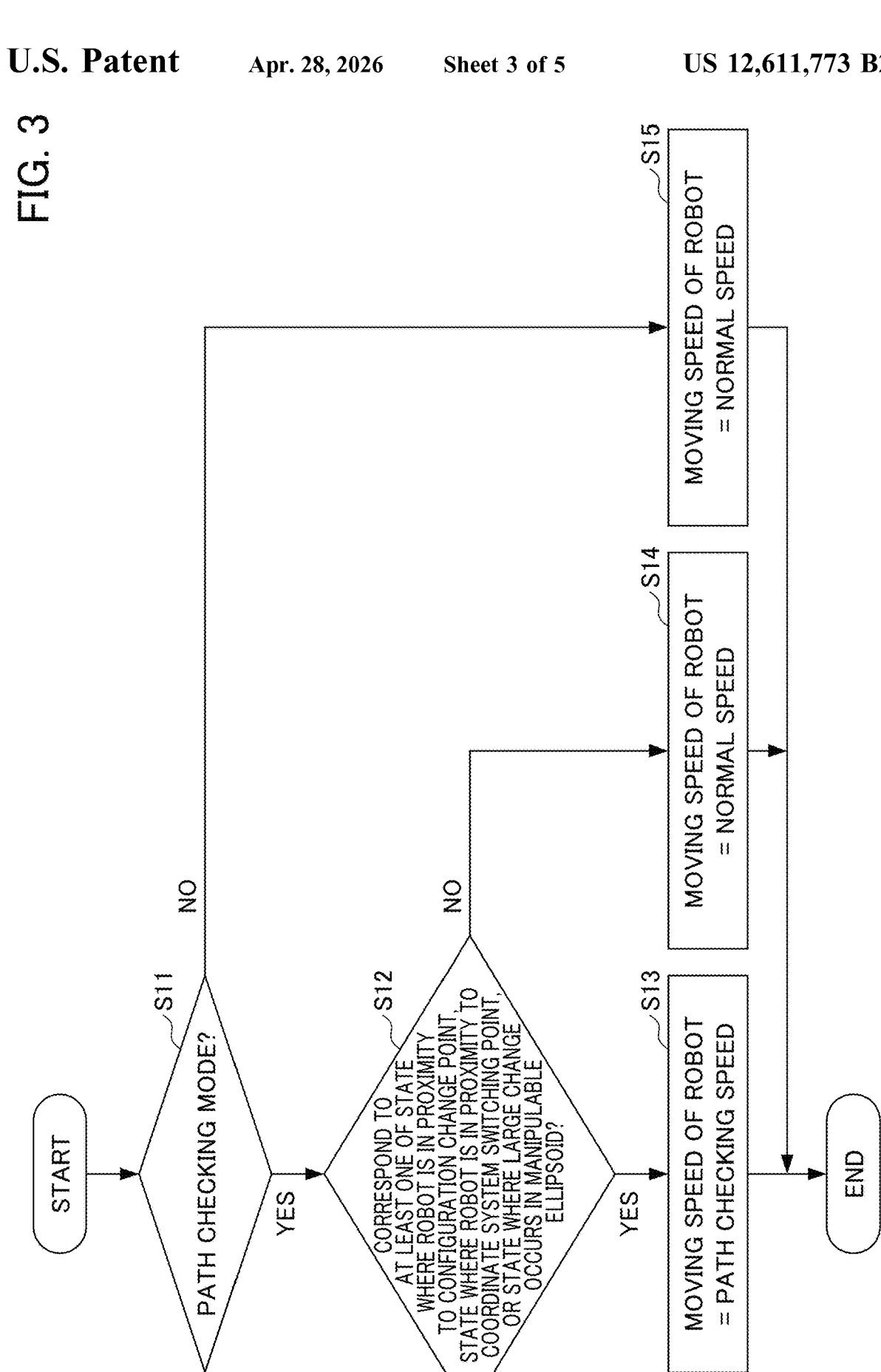
FIG. 3 is a flowchart illustrating a procedure of a robot path checking process according to the first embodiment.

Next, the procedure of the robot path checking process that is performed by the robot control device 3 according to the present embodiment will be described. FIG. 3 is a flowchart illustrating the procedure of the robot path checking process according to the present embodiment. This process may be pre-performed by pre-reading when the robot program is executed, or may be performed in advance because the robot program is stored in the storage unit 31.

In Step S11, it is determined whether or not the robot program is for the path checking mode. If the determination result is YES, the process proceeds to Step S12. If the determination result is NO, which means that the robot program is for the normal motion mode, the process proceeds to Step S15, and then, a moving speed of the robot 30 is set to a normal speed by way of a speed override, and the process ends.

In Step S12, it is determined whether or not the robot 30 is in a state corresponding to at least one of the state in which the robot 30 is in proximity to the configuration change point, the state in which the robot 30 is in proximity to the coordinate system switching point, or the state in which a large change occurs in the manipulability ellipsoid of the robot 30. If the determination result is YES, the process proceeds to Step S13, in which the moving speed of the robot 30 is set to a path checking speed. Specifically, the speed of the robot 30 is reduced or the movement of the robot 30 is stopped by reducing the speed override of the robot 30, and the process ends. If the determination result is NO, the process proceeds to Step S14, in which the moving speed of the robot 30 is set to the normal speed by the speed override, and then, the process ends.

As described above, according to the present embodiment, a determination is made for a section in which the possibility of interference between the robot 30 and the peripheral objects is high, that is, a section in which the posture of the robot 30 considerably changes, and the moving speed of the robot 30 in the section is lowered or reduced to 0 by reducing the moving speed override of the robot 30, thereby making it possible to reliably avoid the interference between the robot 30 and the peripheral objects, while checking the safety of the generated robot path. Therefore, in an operation test of the robot 30, the robot 30 is slowly moved only in a necessary section(s), whereby the operation test can be efficiently performed while reliably avoiding interference and checking the safety of the generated robot path.

In recent years, in order to promote automation of machining sites, there is a demand for a system that controls operation of a machine tool for machining a workpiece and operation of a robot installed in the vicinity of the machine tool in conjunction with each other. Generally, a numerical control program for controlling a machine tool and a robot program for controlling a robot are written in different programming languages. For this reason, an operator needs to familiarize himself/herself with both the numerical control program and the robot program in order to be able to make a machine tool and a robot to operate in conjunction with each other. In contrast, according to the present embodiment, since the robot program including the robot path is automatically created by the numerical control program, the above-described effect can be achieved regardless of the operator's skill.

Second Embodiment

Figure 4:
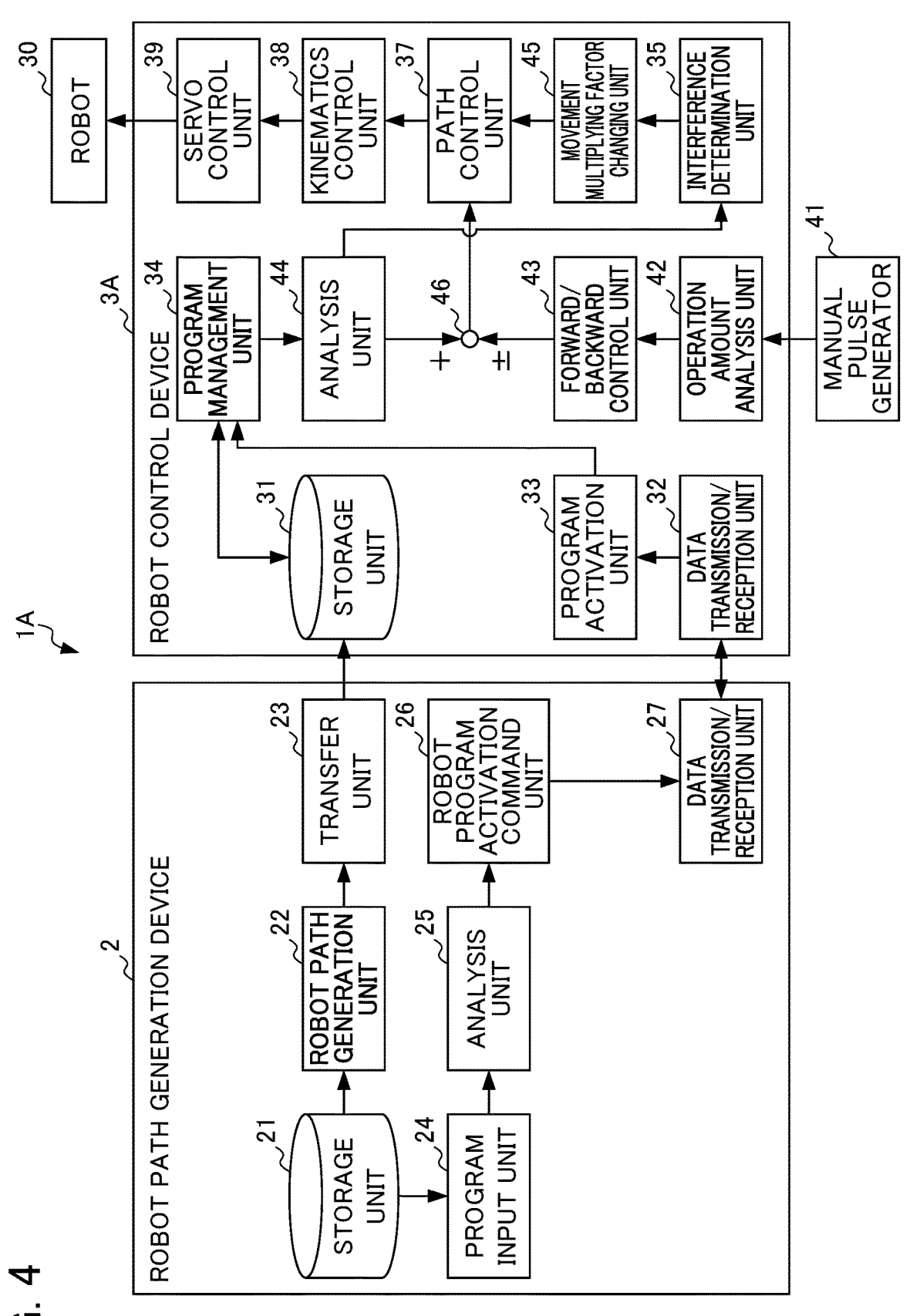
FIG. 4 is a functional block diagram of a robot control system according to a second embodiment.

FIG. 4 is a functional block diagram of a robot control system 1A according to a second embodiment. As illustrated in FIG. 4, the robot control system 1A according to the present embodiment is different from the robot control system 1 according to the first embodiment in that the configuration of a robot control device 3A for controlling motion of a robot 30 partially differs from that of the robot control device 3 according to the first embodiment. Specifically, unlike the first embodiment in which the speed of the robot 30 is changed by the override function, the robot control device 3A according to the present embodiment changes a speed of the robot 30 in accordance with an operation performed via a manual pulse generator. For this reason, the robot control device 3A according to the present embodiment includes an operation amount analysis unit 42 for analyzing an operation amount of the manual pulse generator 41, a forward/backward control unit 43, an analysis unit 44, and a movement multiplying factor changing unit 45.

The manual pulse generator 41 includes a manual handle that is manually operable by an operator. For example, when the operator rotates the rotary manual handle, the manual pulse generator 41 outputs a signal of a pulse train corresponding to the rotation number, and the signal is inputted to the operation amount analysis unit 42, which will be described later.

Based on the output from the manual pulse generator 41, the operation amount analysis unit 42 analyzes a manual operation amount that the operator performed on the manual handle. The operation amount analysis unit 42 outputs the analyzed manual operation amount to the forward/backward control unit 43, which will be described later. The manual operation amount includes a rotation number (rotation speed) in the forward rotation direction and a rotation number speed (rotation speed) in the backward rotation direction.

In accordance with the manual operation amount analyzed by the operation amount analysis unit 42, the forward/backward control unit 43 causes the robot 30 to perform trace motion by making the robot move forward and/or backward on a robot path transferred from the transfer unit 23 and acquired and stored in the storage unit 31. In other words, the forward/backward control unit 43 replaces a moving speed command obtained through an analysis of the robot program by the analysis unit 44 to be described later, with a moving speed corresponding to the manual operation amount analyzed by the operation amount analysis unit 42. Specifically, in a case where a manual operation amount analyzed by the operation amount analysis unit 42 is in the forward rotation direction, the forward/backward control unit 43 outputs a signal corresponding to the rotation number (rotation speed) to an adder 46, thereby notifying to the path control unit 37 that the robot 30 should move forward to perform trace motion at a moving speed corresponding to the manual operation amount, instead of a speed corresponding to a moving speed command obtained by analyzing the robot program. In a case where the manual operation amount analyzed by the operation amount analysis unit 42 is in the backward rotation direction, the forward/backward control unit 43 outputs a signal corresponding to the rotation number (rotation speed) to the adder 46, thereby notifying to the path control unit 37 that the robot 30 should move backward to perform trace motion at a moving speed corresponding to the manual operation amount, instead of a speed corresponding to a moving speed command obtained by analyzing the robot program.

The analysis unit 44 analyzes the robot program activated by the program activation unit 33 under the control of the program management unit 34. Specifically, the analysis unit 44 outputs a moving speed command obtained by analyzing the robot program to the adder 46.

The movement multiplying factor changing unit 45 constitutes a speed changing unit, and reduces a movement multiplying factor for a trace motion speed of the robot 30, thereby reducing the moving speed of the robot 30 or stopping the movement of the robot 30. Accordingly, in a section determined to correspond to at least one of a state in which the robot 30 is in proximity to a configuration change point, a state in which the robot 30 is in proximity to a coordinate system switching point, or a state in which a large change occurs in a manipulability ellipsoid of the robot 30, the speed of the robot 30 is reduced or the movement of the robot 30 is stopped, thereby making it possible to reliably avoid interference between the robot 30 and peripheral objects while checking the safety of the generated robot path.

Figure 5:
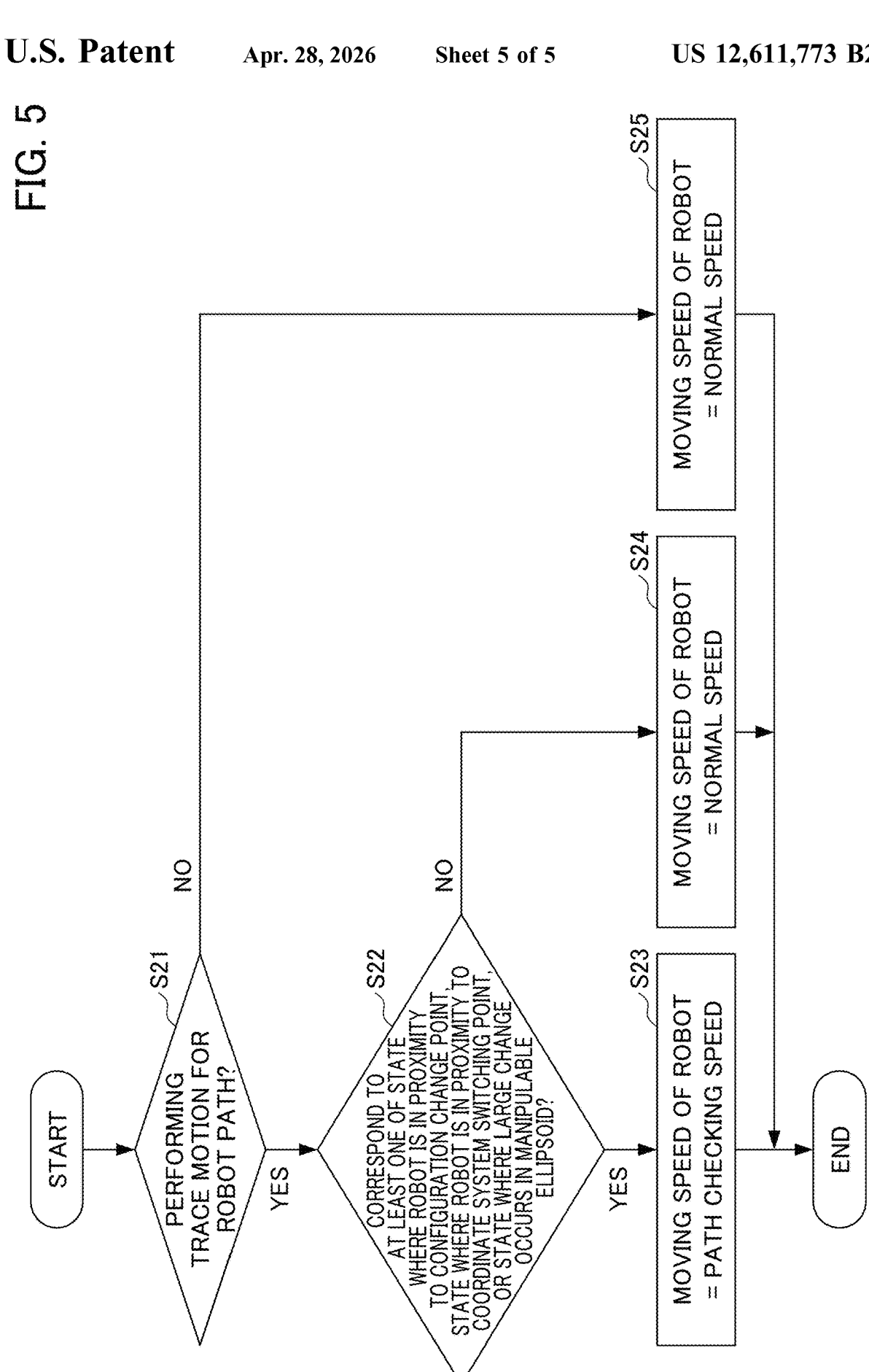
FIG. 5 is a flowchart illustrating a procedure of a robot path checking process according to the second embodiment.

Next, the procedure of a robot path checking process that is performed by the robot control device 3A according to the present embodiment will be described. FIG. 5 is a flowchart illustrating the procedure of the robot path checking process according to the present embodiment. This process may be pre-performed by pre-reading when the robot program is executed, or may be performed in advance because the robot program is stored in the storage unit 31.

In Step S21, it is determined whether or not the robot is performing the trace motion with respect to a robot path. If the determination result is YES, the process proceeds to Step S22. If the determination result is NO, which means that the robot 30 is performing normal motion and not the trace motion, the process proceeds to Step S25, and then, a moving speed of the robot 30 is set to a normal speed, and the process ends.

In Step S22, it is determined whether or not the robot 30 is in a state corresponding to at least one of the state in which the robot 30 is in proximity to the configuration change point, the state in which the robot 30 is in proximity to the coordinate system switching point, or the state in which a large change occurs in the manipulability ellipsoid of the robot 30. If the determination result is YES, the process proceeds to Step S23, in which the moving speed of the robot 30 is set to a path checking speed. Specifically, the speed of the robot 30 is reduced or the movement of the robot 30 is stopped by reducing the movement multiplying factor of the robot 30, and the process ends. If the determination result is NO, the process proceeds to Step S24, in which the moving speed of the robot 30 is set to the normal speed, and then, the process ends.

As described above, according to the present embodiment, a determination is made for a section in which the possibility of interference between the robot 30 and the peripheral objects is high, that is, a section in which the posture of the robot 30 considerably changes, and the moving speed of the robot 30 in the section, which has been set in accordance with a manual operation amount of the manual pulse generator 41, is lowered or reduced to 0 by reducing the movement multiplying factor, thereby making it possible to reliably avoid the interference between the robot 30 and the peripheral objects, while checking the safety of the generated robot path. Therefore, in an operation test of the robot 30, the robot 30 is slowly moved only in a necessary section(s), whereby the operation test can be efficiently performed while reliably avoiding interference and checking the safety of the generated robot path. Furthermore, the operator can run the program forward and backward by using the manual handle (manual pulse generator) during automatic operation, and thus can easily check an error or the like of the program while actually moving the robot 30. Moreover, as in the first embodiment, according to the present embodiment, since the robot program including the robot path is automatically created by the numerical control program, the above-described effect can be achieved regardless of the operator's skill.

The present disclosure is not limited to the above-described embodiments, and various changes and modifications can be made to the present disclosure. For example, in each of the embodiments described above, the case where the present disclosure is implemented by way of the robot control system 1, 1A including the robot path generation device 2 and the robot control device 3, 3A has been described, but the present disclosure is not limited thereto. The present disclosure can also be implemented by a computer program that causes a computer to perform the functions of the robot path generation device 2 and those of the robot control device 3, 3A.

In each of the above-described embodiments, in the case where the robot 30 is in a state corresponding to at least one of the state in which the robot 30 is in proximity to the configuration change point, the state in which the robot 30 is in proximity to the coordinate system switching point, or the state in which a large change occurs in the manipulability ellipsoid of the robot 30, the moving speed of the robot 30 is changed to the predetermined path checking speed. However, this is a non-limiting example. For example, the moving speed of the robot 30 may be reduced to the following speeds: a first path checking speed when it is determined that the robot is in proximity to the configuration change point; a second path checking speed different from the first path checking speed when it is determined that the robot 30 is in proximity to the coordinate system switching point; and a third path checking speed different from both the first and second path checking speeds when it is determined that a large change occurs in the manipulability ellipsoid of the robot 30.

EXPLANATION OF REFERENCE NUMERALS

1: Robot control system
2: Robot path generation device

3: Robot control device
21: Storage unit
22: Robot path generation unit
23: Transfer unit
24: Program input unit
25: Analysis unit
26: Robot program activation command unit
27: Data transmission/reception unit
30: Robot
30*a*: Robot arm
31: Storage Unit
32: Data transmission/reception unit (Acquisition unit)
33: Program activation unit
34: Program management unit
35: Interference determination unit
36: Override changing unit (Speed changing unit)
37: Path control unit
38: Kinematics control unit
39: Servo control unit
41: Manual pulse generator
42: Operation amount analysis unit
43: Forward/backward control unit
44: Analysis unit
45: Movement multiplying factor changing unit (Speed changing unit)
46: Adder

The invention claimed is:

1. A robot control device comprising:
an acquisition unit configured to acquire a robot path for avoiding interference between a robot and a peripheral object present near the robot, the robot path being generated based on a three-dimensional model including the robot and the peripheral object;
an interference determination unit configured to determine, for each of a predetermined section of the robot path, whether a possibility for the robot to interfere with the peripheral object is high in a case where the robot is moved along the robot path acquired by the acquisition unit; and
a speed changing unit configured to reduce a speed of the robot or stop movement of the robot in the predetermined section where the possibility for the robot to interfere with the peripheral object is determined to be high by the interference determination unit, wherein
the interference determination unit determines that the possibility for the robot to interfere with the peripheral object is high in a case where a rate of change in a major axis of a manipulability ellipsoid of the robot and/or a rate of change in a minor axis of the manipulability ellipsoid is/are equal to or greater than a respective predetermined threshold value.

2. A robot control system comprising:
the robot control device according to claim 1; and
a robot path generation device configured to generate the robot path,
the robot path generation device comprising
a robot path generation unit configured to generate the robot path for avoiding the interference between the robot and the peripheral object present near the robot based on the three-dimensional model including the robot and the peripheral object, and
a transfer unit configured to transfer, as a robot program, the robot path generated by the robot path generation unit to the robot control device,
the robot control device further comprising
a program activation unit configured to activate the robot program transferred by the transfer unit; and a program management unit configured to manage the robot program activated by the program activation unit, cause the interference determination unit to make a determination, and cause the speed changing unit to perform a speed change.

3. The robot control device according to claim 1, wherein the speed changing unit reduces the speed of the robot or stops the movement of the robot by reducing a speed override of the robot.

4. The robot control device according to claim 1, further comprising:

an operation amount analysis unit configured to analyze a manual operation amount based on an output from a manual pulse generator; and a forward/backward control unit configured to cause the robot to perform trace motion by moving the robot forward and/or backward along the robot path acquired by the acquisition unit in accordance with the manual operation amount analyzed by the operation amount analysis unit, wherein the speed changing unit reduces the speed of the robot or stops the movement of the robot by reducing a movement multiplying factor of a trace motion speed of the robot.

5. A non-transitory computer-readable medium storing a computer program for a computer that stores a robot program for controlling motion of a robot, the computer program causing the computer to perform operations that comprise:

acquiring a robot path for avoiding interference between the robot and a peripheral object present near the robot, the robot path being generated based on a three-dimensional model including the robot and the peripheral object;

determining, for each of a predetermined section of the robot path, whether a possibility for the robot to interfere with the peripheral object is high in a case where the robot is moved along the robot path; and reducing a speed of the robot or stopping movement of the robot in the predetermined section where the possibility for the robot to interfere with the peripheral object is determined to be high, wherein the computer determines that the possibility for the robot to interfere with the peripheral object is high in a case where a rate of change in a major axis of a manipulability ellipsoid of the robot and/or a rate of change in a minor axis of the manipulability ellipsoid is/are equal to or greater than a respective predetermined threshold value.

* * * * *